May 7, 1968

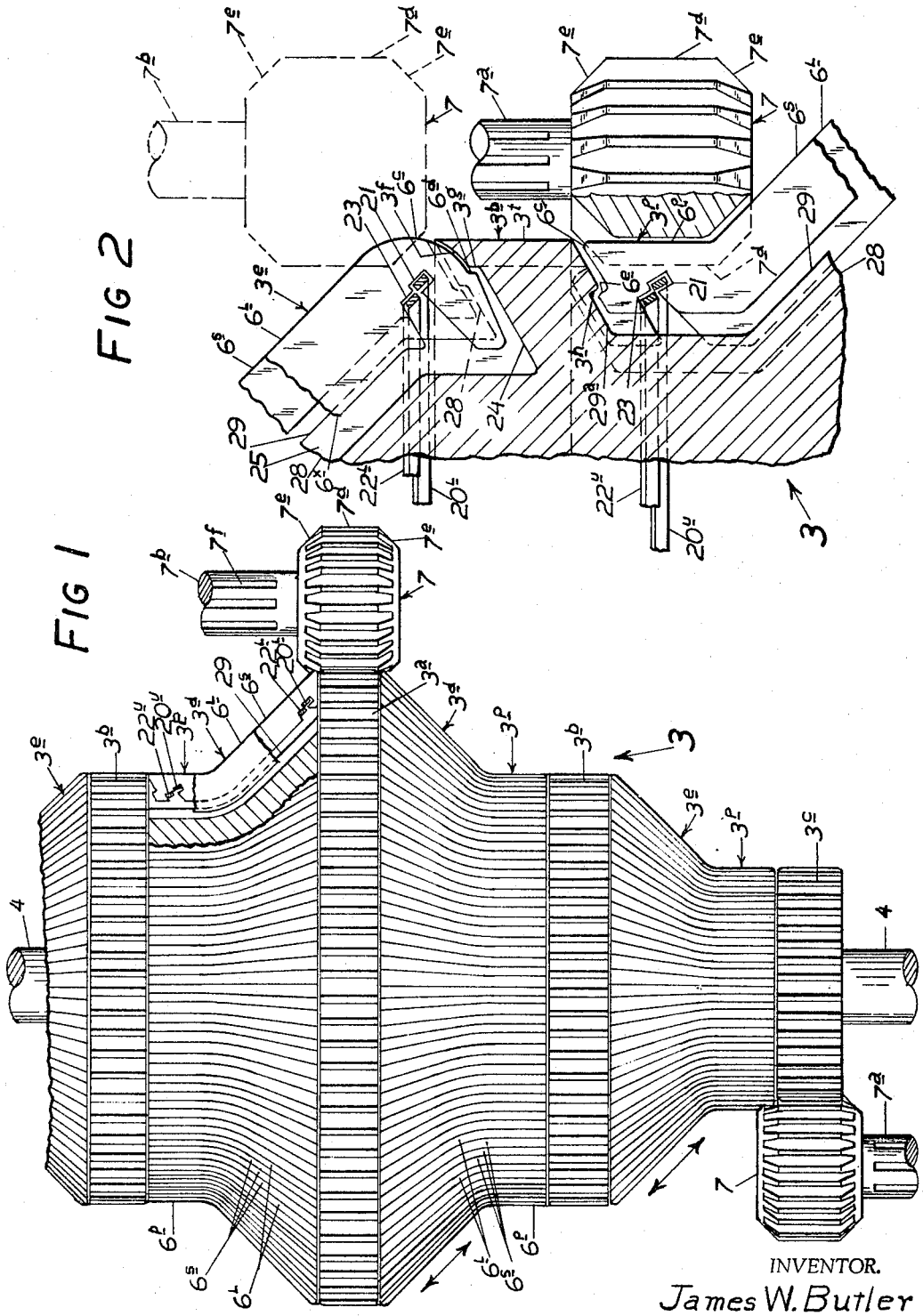

J. W. BUTLER 3,381,544

VARIABLE RATIO GEARING

Filed Sept. 6, 1966

INVENTOR.
James W. Butler
BY
Robert U. Geib, Jr.
ATTORNEY

May 7, 1968 J. W. BUTLER 3,381,544
VARIABLE RATIO GEARING
Filed Sept. 6, 1966 3 Sheets-Sheet 3

INVENTOR.
James W. Butler
BY
Robert U. Geib, Jr.
ATTORNEY

United States Patent Office 3,381,544
Patented May 7, 1968

3,381,544
VARIABLE RATIO GEARING
James W. Butler, 117 Grant Ave.,
Bellevue, Pittsburgh, Pa. 15202
Filed Sept. 6, 1966, Ser. No. 593,230
11 Claims. (Cl. 74—461)

ABSTRACT OF THE DISCLOSURE

The present invention involves a gear having a contact surface which is made up of a plurality of identical and evenly spaced resiliently depressible segments or elements and which cooperates with a mating gear in such manner as to obtain a variable speed ratio.

---

This invention relates to power transmission gearing and particularly to such gearing wherein the power and speed ratios between two or more of the gears may be varied without disengaging or stopping rotation of the same. Variable ratio gearing of the type with which the present invention is concerned is shown and described in my patent application Ser. No. 61,735, filed Oct. 10, 1960 (now abandoned) and patent application Ser. No. 122,348, filed July 6, 1961 (now also abandoned) and patent application Ser. No. 363,647, filed Apr. 29, 1964.

The present application is a continuation-in-part of both my patent application Ser. No. 61,735, filed Oct. 10, 1960, and my continuation-in-part application Ser. No. 363,647, filed Apr. 29, 1964.

As mentioned in my aforementioned patent applications, prior art power transmission mechansims of the class to which the present invention relates require prearrangement of gears of selected diameters for a predetermined ratio of output to input power and speed. Some prior art devices require disengagement of a clutch to stop rotation while another ratio combination of gears is meshed. In others, the planetary set, braking bands are employed to suddenly stop or suddenly release the outer ring and planet gears to change their ratio. In such prior art gearing, the ratios are predeterminedly set and non-variable otherwise.

Another well-known type of prior art power transmission employs pulleys of different diameters, or pulleys adjustable to varying effective diameters, using belts of various types for frictional drive transmission. One similarly used type of belt has tooth forming thin laminations which are arranged to move laterally to engage teeth-like tapered recesses in the face of a matched pair of expandable pulleys.

The belts of all such prior art devices stretch and are otherwise subject to accelerated deterioration.

Reliance on friction is eliminated with the type of belt employing the metal laminations, but because of the need for some solid, non-laminated linkage between the laminations sets, an objectionable slipping or jumping over the solid linkage, from one laminations set to the next lamination set, results.

It is among the objects of the present invention to provide a novel gear mechanism wherein the speed ratio may be effectively varied, either adjustably or automatically, without slippage or interruption of any kind in its rotation and without resort to band or clutch engagement or disengagement.

Another object of the present invention is the provision of a mechanism which is characterized by the inclusion in a gear of a portion which is temporarily deformable, in the manner of blade-like laminations, and a second and cooperating portion which is undeformable, the purpose of which will become more fully understood hereinafter; and a mating gear which is adapted to cooperate with either or both of the deformable and/or undeformable portions of the first said gear.

Still another object is to provide a power transmission mechanism wherein some or all mating gears may have deformable tooth portions in the manner of blade-like laminations, and wherein the ratio may be variable or non-variable as desired.

The invention, then, comprises the features hereinafter fully described and as particularly pointed out in the claims, the following description and the annexed drawings setting forth in detail certain illustrative embodiments of the invention, these being indicative of but some of many ways in which the principles of the invention may be employed.

In said drawings:

FIGURE 1 is a fragmentary plan view, partly in section, of a power-transmission apparatus employing variable ratio gearing of the type contemplated by the present invention, the same being shown as comprising an input shaft and an output shaft, each having a gear whose face is in mesh with and adapted to cooperate with an intermediate gear which is characterized by the inclusion of a portion of its face which is deformable and a portion of its face which is undeformable;

FIGURE 2 is an enlarged fragmentary view, partly in section, which illustrates in more detail the solid and deformable portions of the face of the intermediate gear of FIGURE 1;

Figure 3:
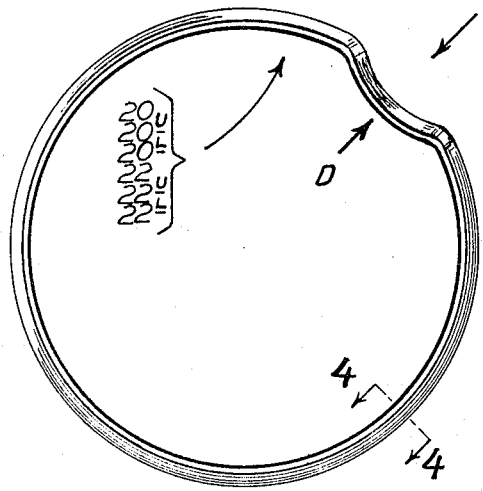
FIGURE 3 is a plan view of a type of generally circular spring which in the illustrative embodiment, is utilized in four (4) separate locations in the resiliently faced portion of the gear of the present invention, the same being shown in deformed shape resulting from the pressure of the laminated segments when depressed by the aforementioned, and rigidly-faced, gear which cooperates therewith.

Referring more particularly to the drawings, the numeral 4 designates a shaft which carries the novel intermediate gear 3 of FIGURE 1 of the present invention, said shaft to be suitably mounted for rotative and axial movement. Any suitable means which will permit the said intermediate gear 3 to be moved axially, relative to the cooperating spur type surfaces 7d, and diagonally, as indicated by the double-headed arrows, relative to the mitre type surfaces 7e, of the driving and/or driven gear(s) 7 also shown in FIGURE 1 may be employed; the same as such forming no part of the present invention, and accordingly is neither illustrated in the drawings nor further described hereinafter.

As will be observed in FIGURE 1, the gear 3 is comprised of a centrally disposed large peripherally toothed ring 3a to each side of which there is a resilient frustro-conical portion 3d which diverges axially and cylindrically to form a resilient plateau portion 3p, a second solid peripherally toother ring 3b of medium diameter and a second (and smaller) frustro-conical portion 3e with another plateau portion 3p, and then a small peripherally toothed ring 3c.

Referring still to FIGURE 1, the body portion of the gear 3 is in assembly substantially solid, except for its bore, the peripherally toothed portions 3a, 3b and 3c being rigidly joined thereto in concentric alignment wth the circular shaft 4 extending through a bore 2a provided therefor.

The two frusto-conical and conjoined plateau portions 3d, 3e and 3p are made up of elements which are resiliently depressible inwardly in a manner which will be described more fully hereinafter and, according to the teachings of the present invention, the novel gear 3 is adapted to cooperate with a gear 7 secured to a drive shaft 7a, the latter gear being in parallel with the shaft 4. (See FIGURES 1 and 2.)

The gear 3 is shown in dual (two-sided) form with two gears 7 employed, one on an input or driving shaft 7a, the other on an output or driven shaft 7b, as most clearly seen in FIGURE 1, but it will be understood, however, that a single-sided gear 3 and a single mitre and spur gear 7 is equally within the contemplation of the present invention.

Each of the gears 7 is mitre-spur-mitre in form, comprising two distinct types of toothed surfaces, one of said toothed surfaces being pitched from a cylindrical surface portion, the other being frustro-conical in shape, as shown at 7d and 7e respectively.

Accordingly the cylindrically pitched portion or spur face 7d may mesh with one of the solid peripherally toothed rings 3a, 3b, or 3c as well as with either of the cylindrically formed resilient plateau portions 3p of gear 3 while the frusto-conical portion or mitre face 7e may mesh with one of the resilient frusto-conical portions 3d or 3c of the said gear 3.

In lieu of the angular relationship shown in FIGURE 2, the junction between the toothed portions 7d and 7e of the mitre-spur-mitre gear 7 may be rounded or curved, provided full utility of each of the two distinct surfaces is maintained, and the gears carrying the said two distinct surfaces may be of any relative size or shape and not limited to the spur and mitre formation illustrated.

According to the teachings of the present invention, the resilient faces or frusto-conical portions 3d and 3e of gear 3 are made up of a plurality of blade-like, thin laminated segments (preferably of metal) which are generally indicated at 6, and whose major planes converge onto the axis of the bore for shaft 4.

Figure 9:
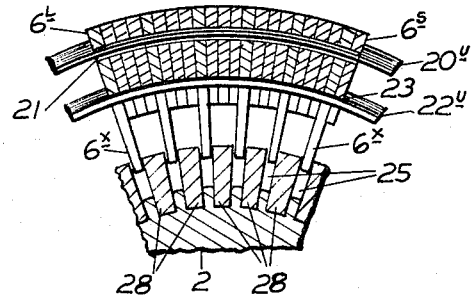
FIGURE 9 is a fragmentary end view, partly in section, illustrating a group of alternately disposed long and short laminated segments when in extended, non-depressed position, i.e., when at rest on the springs.

These blade-like, thin metallic laminated segments 6 are continuously tapered radially inward, thinning inwardly and thickening in converse outward radiation as most clearly seen in FIGURE 9, resulting in a lengthwise taper of their outer edges which is thicker at that portion of a truncated-coniform core (i.e., core 2, FIGURE 5) which in assembly forms the largest diameter of its resilient face and thinning toward the opposite lengthwise end, that which is assembly forms the smaller diameter portion thereof. As will be readily understood as this specification proceeds, these thin, metallic laminated segments are resiliently displaceable inwardly toward the axis of the gear (toward the axis of bore 2a of core 2 of FIGURE 5) by the teeth of a smaller rigid-toothed gear 7 which may be carried by either an input shaft 7a or by an output shaft 7b, as most clearly seen in FIGURE 1.

Certain of these laminated segments 6 are long, as indicated by the symbol 6L, while the others are substantially shorter, as shown at 6S. These long and short laminated segments, 6L and 6S respectively, are resiliently mounted in such manner that certain of them will, at intervals, be depressed by the teeth of the adjacently mounted smaller rigidly-faced gear 7.

Figure 6:
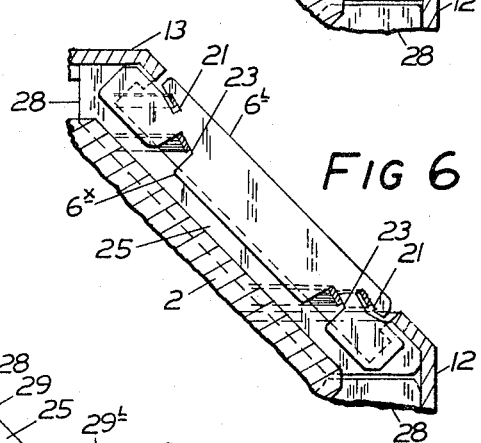
FIGURE 6 is a sectional view illustrating a long laminated segment similar to that shown in the assembly of FIGURES 1 and 2, but modified for assembly in the truncated-coniform core of FIGURE 5.

To give stability to the laminated segments, the long ones (i.e., 6L) are lengthened beyond the shorter segments 6S so as to extend into and slide up and down in the slots 24 formed by alternately spaced segments separators 28, or in the upper and lower slots 24U and 24L shown in FIGURE 6. These longer laminated segment 6L also possess depth extensions 6X which extend into and slide up and down within channels 25, most clearly seen in FIGURE 11.

With the said slots 24, togther with channels 25, holding the long laminated segments 6L against circumferential dislodgment by the torque force of the teeth of the rotating rigid-faced gear(s) 7, the long laminated segments thus provide the major portion of the structural strength of the resiliently-faced gear; while the short segments 6S are needed and principally used to fill in the gaps between the longer segments in formation of a laminated tooth.

Figure 5:
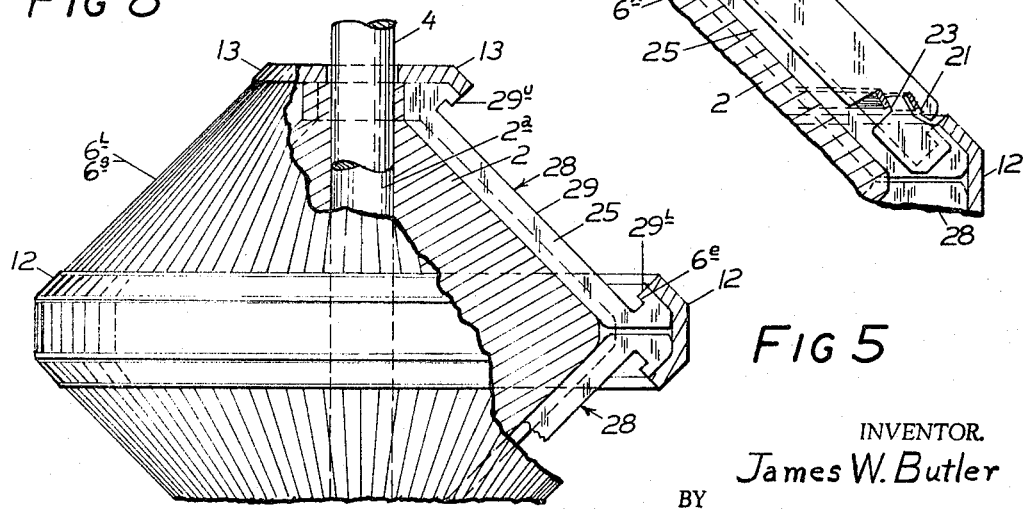
FIGURE 5 is an elevational view, partly in section, showing a truncated-coniform cored gear similar to that of FIGURES 1 and 2 but without the non deformable toothed-rings of FIGURES 1 and 2.

The short laminated segments 6S, however, are tied to and are confined by and between the longer segments by the circular springs 20U, 20L, 22U, and 22L and they are axially confined by slide faces 29a of toothed-rings 3a, 3b and 3c are by the upper and lower slide faces 29U and 29L of FIGURE 5. The shorter segments 6S are also confined in radially inward movement to a depth laminated by the top face 29 of segment separators 28 unless, as optionally permitted, they are supplied with the previously described depth extensions 6X. The longer segments 6L are also so limited, by the depth of channels 25.

All segments, 6L and 6S, are limited in radially outward movement by their extensions 6d and 6e, when in contact with extension stops 3g and 3h of toothed-rings 3a, 3b and 3c (see FIGURE 2), thus movement of the segments in all directions is limited and controlled, including the limit of their radial extension, which prevents the segments from flying out of the gear when it is in rotation.

Figure 10:
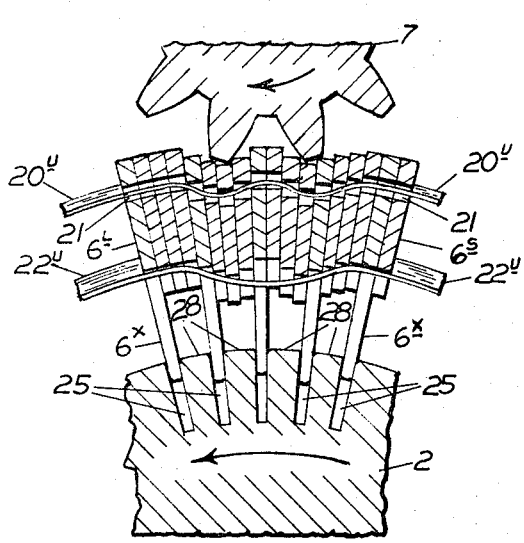
FIGURE 10 is a fragmentary plan view, partly in section, and illustrating the effect of the aforementioned springs on adjacent laminated segments when any one segment is depressed.
Figure 11:
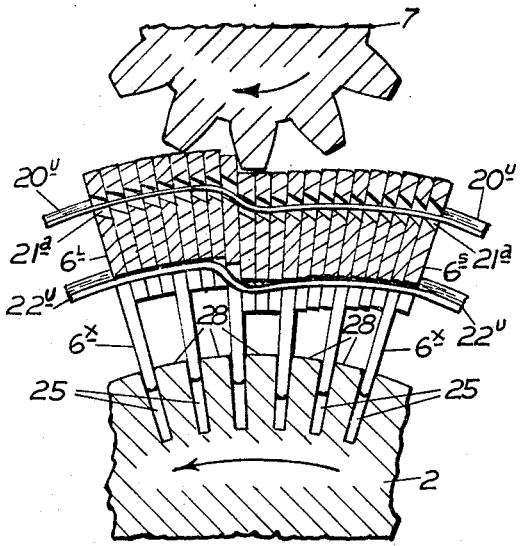
FIGURE 11 is a fragmentary plan, partly in section, of a modified form of the spring recess with slightly changed effect of the guide springs on the laminated segments, with the resultant effect on one adjacent laminated segment varying somewhat in degree to the effect on the other, or oppositely adjacent laminated segment, as illustrated.

Placing of the teeth of the mitre surrface 7e of gear 7 in mesh with the outer edges of the laminated segments 6L and 6S will cause a depression of certain of said segments to the extreme depths of inward position, certain others only partially so, and still others not at all, as seen in FIGURES 10 and 11. From this automatic selection of segments 6L and 6S by the teeth of the rotating rigid-faced gear 7, a built-up tooth of proper pitch and depth is formed to thereby cause the face of the gear, formed by the laminated segments, to also rotate.

It will be observed that the pitch and depth of the teeth of the solid-toothed gear 7 is unalterable and that in mesh with the laminated segments 6L and 6S at a point of smallest assembled face diameter (see FIGURE 1) more of the segments, thinner at that point, will be depressed, and more of them will fit between the teeth of said gear 7, and when in mesh with the said laminated segments at a point of largest assembled face diameter fewer of the said segments, thicker at that point, will be depressed and fewer of them will fit between the teeth of the said solid-toothed gear(s) 7.

Figure 4:
FIGURE 4 is an enlarged fragmentary detail taken on the line 4—4 of FIGURE 3 and illustrating the cross-sectional shape of the circular spring shown in FIGURE 3.
Figure 8:
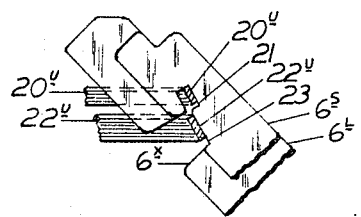
FIGURE 8 is a fragmentary sectional view, of side-by-side long and short laminated segments, similar to those of FIGURES 6 and 7 but illustrating a modified arrangement of the outwardly biasing springs and keeper means or notches therefor and eliminating the anchors of the long laminated segments which are present in FIGURE 6.
Figure 7:
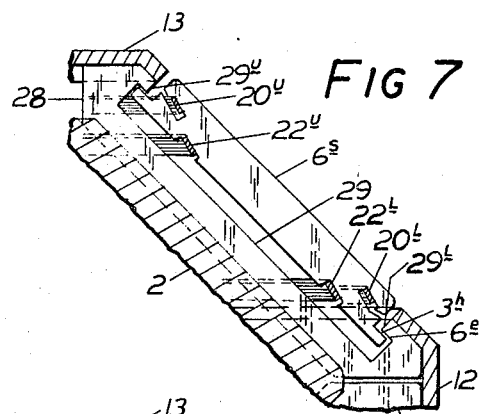
FIGURE 7 is a sectional view similar to FIGURE 6, but illustrating one of the shorter laminated segments.

The laminated segments 6L and 6S are also maintained in an outward and undeformed state by the aforementioned springs, which also serve to restore each of the segments to said undeformed state after each interval of displacement. Each of the said springs, outer and/or inner, upper or lower springs 20U, 20L, 22U, and 22L, is continuously circular and normally concentric with the axis of the gear of which it is a part and, when used with a frustro-conical gear, each is flared at an angle to so position its peripheral surface at approximately right angles to the direction of its expected indentation or its re-extension when being depressed or being relieved of such depression. The flare of said springs is shown in FIGURE 4 and their relative positions shown most clearly in FIGURE 2.

Figure 12:
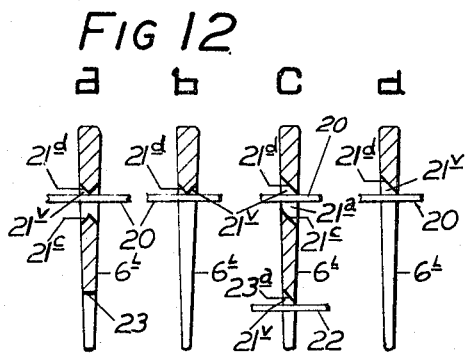
FIGURE 12 is a series of sectional views of the laminated segments with modified spring recesses and spring ledges.

All of the circular springs 20U, 20L, 22U and 22L, except for size and strength, may take the same shape and react in similar manner when deformed by the teeth of a rigid-faced gear, however, the outer upper spring 20U and outer lower spring 20L have a special function when in confined relationship with and within the spring recesses 21, 21a and 21b; and springs 22U and 22L have a special function also, when in contacting relationship with angled ledges 21d or 23a, as will appear hereinafter. (See FIGURES 12 and 13.)

While all of the illustrated springs will return the laminated segments 6L and 6S to normal position when inward pressure is removed, it is possible if, or when, only one spring, spring 22U, were used and, as in contact with squared edges such as spring ledges 23 (see FIGURE 12a), for one or more of said segments to be in the extended position and immediately behind a meshed tooth of the rigid-faced gear 7 as it rotates, as best seen in FIGURE 10. The lever-and-wedge action, thus invited on the next-to-be-depressed segment by the tooth of said rotating gear 7, might then act to distort that portion of the segment rather than to depress it as desired. The outer upper spring 20U and outer lower spring 20L, within spring recesses 21, prevent this occurrence, as will be readily understood.

It will be observed in FIGURE 10 also, that the openings of the recesses 21 are somewhat larger than the thickness of the outer springs 20U and 20L, thereby permitting certain play or movement of the spring(s) within the said opening(s); but it does confine the spring spring to the extent that prolonged radial movement of a laminated segment ultimately moves the spring, which in turn ultimately moves each of the adjacent segments. The spring ledges 23 differ in that they move the said springs 22U and 22L only upon inwardly (radial) movement of the segments or segment furthest depressed, as also seen in FIGURE 10.

Radially inward pressure to the extreme on one laminated segment will, of course, depress that segment to its extreme depth of inward position. The effect of springs 20U and 20L on the segments adjacent to the depressed segment(s) is a constantly graduated declination of all of the segments affected.

Depression of one segment displaces the springs 20U and 20L inwardly, this in turn causes the adjacent segments to move inwardly. The displacement of each succeedingly adjacent segment decreases as its distance from the initially displaced segment increases, and in a pattern or to a degree determined by the size of the openings either of squared spring recesses 21 or of angled spring recesses 21a and the degree of the angle of upper and lower spring ledges 21d and 21c, respectively, defining the openings of angled spring recesses 21a, as shown most clearly in FIGURES 10, 11 and 12.

The outer springs 20U and 20L then have the prime and special function of partially positioning the laminated segments 6L and 6S immediately behind the effective tooth of the rotating rigid-faced gear 7 so that, as the assembly rotates, each such segment will be drawn inwardly sufficiently to avoid the rocking-lever action of the said (solid) tooth, which might otherwise distort the said segment(s); placing them instead in proper position for further inward displacement to begin formation of the lamination arrangement of the next built-up resilient tooth. As will be readily seen, little structural bulk or strength is required of the outer springs 20U and 20L, but they may be so strengthened and used as the sole means for maintaining and realigning the laminated segments in outward extension; eliminating any need for including the inner springs 22U and 22L.

The angled spring recesses 21a, as shown in FIGURE 11, are also designed to cause lessened depression therefore greater extension of those laminated segments immediately ahead of the tooth of the rotating rigid-faced gear 7, where more strength of structure is required; this at the expense perhaps of those laminated segments immediately behind the aforementioned (rigid) tooth where the concern only is the prior positioning of them for proper inward depression, as previously explained. The drawings illustrate an approximate 30-degree difference in the angle of the upper spring ledge 21d, which with lower spring ledge 21c defines the opening of spring recesses 21a (see FIGURE 12c), when compared with the squared edge of spring ledge 23 (see FIGURE 12a) or the squared edges defining the openings of spring recesses 21 (see FIGURE 10). The angularity of the said spring ledges 21d and 21c will permit the adjacent (laminated) segment on the fore or advanced side of a pressure-depressed segment to extend proportionately further outwardly than the adjacent segment behind it before it is restricted by the lower spring ledge 21c in contact with outer spring(s) 20. A greater angular pitch of spring ledges 21d and 21c will provide a greater difference in the relative extension limits of the affected segments.

As previously indicated the laminated face of gear 3 is divided into two sections, 3d and 3e, each having a plateau portion 3p, as distinguished from the single laminated section indicated for a gear core as shown in FIGURE 5. Since the tapered laminated segments are not continuous of length from set to set, the number of such sections may vary almost without limit. The constant increase in thickness with increase in length of the tapered segments is interrupted by the alternately spaced peripherally toothed rings or rings such as ring gears 3a and 3b which keep the increasing thickness within desirable limits; while still providing for practically limitless variability of ratio.

In addition to the previously described operational effects, the laminated segments 6 are provided on their ends with inclined faces 6c which may be curved or angular, as seen in FIGURE 2. These inclined surfaces coincide with the adjacent edges and slotted faces 3f of the mating teeth 3t of the respective ring gears 3a, 3b and 3c and provide more continuity as between the segments and the solid teeth of the said ring gears.

The continuity of teeth and laminated segments provided as described permits the leading mitre surfaces 7e of the mitre-spur-mitre gear 7 to "climb" the inclined faces 6c, depressing each segment a little further with each successive revolution and with each increment of axial advancement, in order to move out of mesh with the solid toothed-ring gear 3a or 3b and into mesh with the resilient face 3d or 3e, to then be activated to move on to the next adjacent ring gear 3b or 3c.

Entry into mesh with the solid teeth 3t of the respective ring gears 3a, 3b or 3c from either direction by the mitre-spur-mitre gear 7 is aided by a circumstance of design which of necessity provides normal but minimal spacing between each of the laminated segments 6L and 6S.

The spacing referred to permits slight compacting or lateral compression of the segments by the revolving gear 7 so that, in revolving the set of segments comprising a built-up tooth will not normally include the same segments in each successive revolution of the intermediate gear 3 and, gradually falling behind, because of the said compression or because of an eventual unequal divisibility of the total number of said segments there will be assembled a tooth-set of segments in proper alignment with a tooth 3t of the adjacent ring gear, permitting axially sliding entry into the enmeshment previously anticipated and described.

While the intermediate gear 3, as illustrated in FIGURE 1, is designed to move axially and diagonally relative to the fixed position of the rotatable mitre-spur-mitre gear 7, the said gear 7 is secured to a driving shaft 7a having a splined portion 7f, said shaft being adaptable for sliding connection with another gear or driving instrumentality (not shown). The splines 7f will permit forward and backward sliding axial movement of the said gear 7, into and out of mesh with the ring gear portions 3a, 3b and 3c, and the plateau portions 3p of the said intermediate gear 3, eliminating the need for axial movement of the said gear 3 if such an alternate arrangement is desired. Any conventional means for providing diagonal as well as the said axial sliding movement of said gear 7 may be employed.

With the driving and driven gears 7 in the fixed but rotative position shown in FIGURE 1, the previously described axial and diagonal movements of the intermediate gear 3 relative to the said gears 7 is the same, at least in effect, as if both of said gears 7 were instead caused to simultaneously move in the aforementioned axial and diagonal directions relative to a then fixed but rotative intermediate gear 3.

In order to get out of mesh with the respective ring gears, and into mesh with the respective resilient faces of the intermediate gear 3, the mitre-spur-mitre gear 7 will be caused to move axially forward to the position illustrated in FIGURE 2 by the "visual" gear 7, preparatory to ascending diagonally to the next larger ring gear 3a; or it may be caused to move axially backward, to the position illustrated by the "phantom" illustration of gear 7 (also shown in FIGURE 2), preparatory to descending diagonally to the next smaller ring gear 3c.

When diagonal movement of the mitre-spur-mitre gear 7 has proceeded to the point of adjacency with the next larger, or next smaller, ring gear, it will then be in the reverse of the position illustrated in FIGURE 2. The diagonally descending "visual" gear 7 is prepared for axially sliding backward movement into mesh with the adjacent ring gear from the resilient plateau portion 3p, while the ascending "phantom" of gear 7 is prepared for axially sliding forward movement from the apex of the resilient frustro-conical portion 3e into mesh with a similar ring gear.

In each instance, the diametral pitch of the teeth of the spur face 7d of the mitre-spur-mitre gear 7 and the teeth 3t of the ring gears 3a, 3b and 3c are the same and compatible with each other and with the cylindrically disposed axial extensions 6p forming the resilient plateau portion 3p while the pitch angle and taper of the mitre faces 7c of said gear 7 will coincide with the degree of tapering thickness of the laminated segments 6L and 6S making up the resilient frustro-conical portions 3d and 3e of the intermediate gear 3.

In operation: with the mitre-spur-mitre gear 7 shown in the lower left of the illustration of FIGURE 1 (assumed as being the driving gear attached to the driving shaft 7a) one rotation of said driving gear 7 in mesh with ring gear 3c (of equal diameter) will cause one rotation of the intermediate gear 3 and all connected ring gears 3a, 3b and 3c. With the driven gear 7 also in meshed relationship with the said intermediate gear (specifically at and in mesh with the larger ring gear 3a of perhaps five times its diameter), it will require only one revolution of the driving gear to produce five revolutions of the driven gear; for a ratio of five output revolutions for each single input revolution.

As the relative positions of the driving and driven gears 7 change, with the diagonal movement of the intermediate gear 3, the ratio of output to input changes until the said driving gear reaches, and meshes with, the medium sized ring gear 3b on the driving side of said intermediate gear 3; while the said driven gear reaches and simultaneously meshes with the medium sized ring gear 3b on the opposite or driven side of the said intermediate gear 3. Under these conditions the ratio will be fixed at one input revolution for each output revolution; since the driving and driven gears 7, being of size equal to each other, will be driving, and in turn be driven by, the respective medium sized ring gears 3b which are also of size equal to each other.

Resumption of such diagonal movement in the same diagonal direction will eventually place the driving gear 7 in mesh with the larger ring gear 3a and the driven gear 7 in mesh with the smaller ring gear 3c, exactly opposite to the relationship shown in FIGURE 1, with the ratio fixed at one output revolution for every five input revolutions.

The novel gear mechanism of the present invention thus provides speed and power ratio variation without interruption in its rotation, through its deformable face, and, for sustained operation, solid-toothed gearing of predeterminedly selective and set ratios, through engagement of its respective solid-toothed gears.

Figure 13:
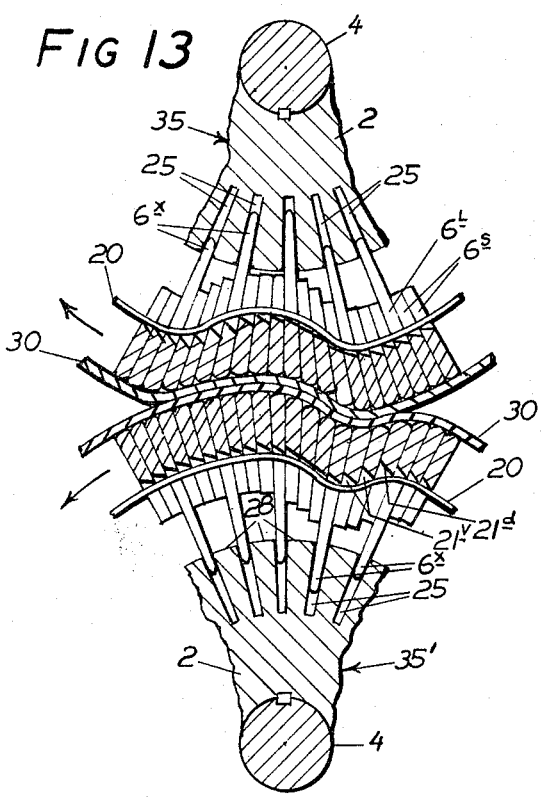
FIGURE 13 is a fragmentary plan view, partly in section, of the laminated segments of a mated pair of resiliently faced gears when in rotating condition, showing the need for only one spring and one angled spring ledge; and a resilient covering added to the laminated faces of the deformable gears.

A modification, shown in FIGURE 13, contemplates the mating of two resiliently faced gears, similar to intermediate gears employing the truncated-coniform core 2 of FIGURE 5, which may be frusto-conical, as indicated, or spherical or cylindrical in shape, and of any arrangement or design, for variability or non-variability of ratio, with more than two in number if desired.

The prepositioning by induced partial displacement of certain of the segments is not required in the mating of two or more of the resilient faced gears 35 of the present invention, unless a solid-toothed gear is also involved in direct enmeshment therewith. Outer springs 20 within recesses 21a may be optionally included or eliminated, and inner springs 22 alone used, with the angled spring ledges 21d, to maintain or restore outward extension of the segments; and to delay such restoration to outward extension of certain of the immediately affected segments sufficiently to cause formation of a selective step-like pattern of the segments in their realignment in said outward (radial) extension.

Since the angled pattern of the angled spring ledges 21d determines how much and when the segments will be delayed in realignment and the rotative direction in which they will be so affected, the double angled spring ledges 21d with or without ledges 21c (see FIGURES 12a and 12b) will be substituted when such delayed realignment (of the affected segments) is desired in both rotative directions of the respective gears 35.

Figure 14:
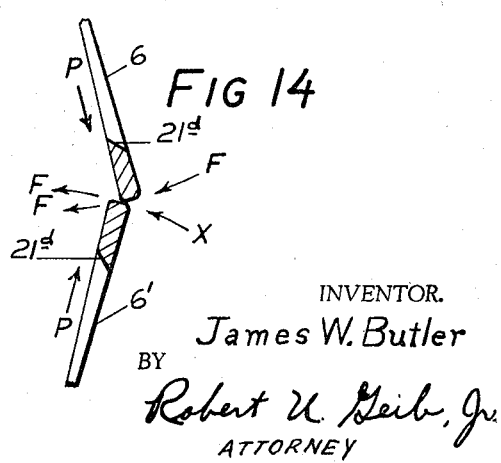
FIGURE 14 is a sectional view of two opposing laminated segments illustrating the initiative advantage inherent in each of the laminated segments of the driving laminated gear at the inception point of contact with the laminated segments of the driven laminated gear.

The driving gear 35 is assumed as having a slight advantage, an advantage of initiative, over the driven gear 35'; with respect to the action and reaction at the incidence of contact of the respective opposing segments of both gears as they revolve in meshed relationship with each other (see FIGURE 14). With the springs 20 or 22 exerting approximately equal outward pressure (indicated at P), the torque force (indicated at F) is shown before and after contact as for segment(s) 6 of said driving gear 35, but only after said contact as for segment(s) 6' of said driven gear 35'.

The referred to initiative advantage is found in the compacting and the temporary friction-fortification against radial sliding movement by the resultant compression, in diminishing and to vanishing intensity, of the numerous driving gear segments 6 rotatively following any said segment 6 caused to meet with initial or any resistance to its rotation.

The compacting and temporary friction-fortification of numerous of only certain of the laminated segments, as explained hereinbefore, is, of course, inherent in both gears; initiated with the driving gear 35, and upon its segment(s) 6, when meeting first resistance to its rotation, but immediately transferred to the segment(s) 6' of the driven gear 35' upon its contact and its meeting resistance to rotation, then diminishing to vanishing in intensity in opposite rotative directions in each gear; counter-clockwise in said gear 35 and clockwise in said gear 35', when in the relative positions shown for each of said gears in FIGURE 13.

The said initiative advantage, however, is exploited in the isolation and displacement of each of the then non-friction-fortified driven gear segments 6' as each is contacted in rotation by the friction-fortified numerously grouped segments 6; and at an incidence angle approaching the parallel to its (segment 6') direction of displacement, causing full displacement of each segment 6' before it can react.

The contact angle of the opposing segments will change in rotation, and will become equal, and parallel with each other, at the point of greatest friction-fortification of the respective segments, 6 and 6'; the pressure P (see FIGURE 14) exerted by springs 20, then also having equal effectiveness (other factors being equal), will then be the sole determinant in realignment of the respective segments.

The triangular space or void 21V, shown in FIGURE 13, as formed by the angled spring ledge 21d of each laminated segment 6L or 6S (6 and 6') and by the spring(s) 20, as seen at the undepressed segment areas of both gears, must be occupied by the extending said spring(s) before each of the segments, 6 or 6', is fully affected by the extending said spring(s); and the indented or displaced portion of said spring(s) 20, caused by the displacing movement of the said segment(s), must of necessity occupy some other place in its reactive and partial expansion.

In meshed relationship, the opposing resiliently faced gears 35 and 35' will be tightly pressed one against the other with a portion of the resilient face of each gear indented accordingly; causing displacement of numerous of the laminated segments 6L and 6S (6 and 6') to partial and unequal degree; causing also an equivalent indentation in each of the springs 20.

With the initial rotation of the driving gear 35, and the initiative advantage inherent therein, as explained hereinbefore, its compacted and friction-fortified segments 6 will, in rotation, isolate and depress each of the opposing non-friction-fortified segments 6' to their extreme depth of displacement; depressing the spring 20 in the process. The said spring while being depressed is indented in a rolling and continuous fashion, as is also its re-extending portion, beginning its re-extension immediately after reaching its extreme depth of displacement; under the urging pressure of the displaced segments 6'.

In re-extension, the spring 20 will press against the spring ledge 21d of each segment 6', re-extending each said segment in proportion to its ability to overcome the equally reactive pressure of the opposing spring 20 (in gear 35) and the resistance to radial sliding of all segments 6 and 6'.

With the spring 20 of the driven gear 35' already under the expansion causing pressure of its present displacement, and its opposing spring under no such said pressure at that point of opposition; and with the segment(s) 6' under the extreme intensity of its friction-fortification, and aided as regards radial sliding by its outwardly increasing thickness which will relieve the said friction-fortification by any outward, wedge-relieving, and peripheral expansion movement, said segment 6' then also opposing segment(s) 6 whose friction-fortification has vanished; and with the combined force of several segments 6', aided by a comparatively large area of the tensed spring, in concentration on one opposing segment 6, and at one point on the opposing area of the opposing spring 20, the said segment(s) 6' will be seen as having no significant resistance to its re-extension. Accordingly, each may then be realigned in a temporary but continuous step-like pattern when in rotation, the arrangement and the degree of radial angularity of the step-like pattern being determined by the degree of angle of the angled spring ledge(s) 21d.

With use of the angled spring ledge 21d, a squared "leading" edge is eliminated on the segment, prolonging its extreme depth of displacement to a degree proportional to its thickness at the said ledge (as can be visualized in an assumed transverse movement of the segment(s) 6' relative to a fixed indentation in the then assumed-to-be non-rotating spring).

A converse delay in realignment will result from prolonged displacement of the segment(s) 6', but an acceleration of realignment of the segment(s) immediately rotatively preceding the latest delayed segment(s) will also result; causing a temporary but continuous step-like formation of the segments, at the realignment area, of greater radial extension degree than the similar step-like formation of the segments caused priorly during displacement; resulting in the continuous-one-tooth segment formation pattern shown in FIGURE 13.

While the strength of a mechanism comprising two meshing resiliently faced gears, such as gears 35 of the present invention (its ability to transmit rotative power and to withstand the torque forces involved therein) may not be as great as the said strength of similar mechanisms comprising solid-toothed gearing, or even with the less so strengthened combination of resilient-faced and solid-toothed gearing, its said strength advantage over that of friction gearing is readily recognized. With the resultantly acquired silent-like operation, however, inherent in friction gearing, a compensating advantage over that of solid-toothed gearing is also seen and readily recognized.

The resilient covering 30, as seen in FIGURE 13, is designed to enclose and to cooperate with the laminated segments 6 of any of the resiliently faced gears of the present invention, and to further aid in the control of displacement and realignment of the said segments; as well as to muffle or to eliminate the clatter involved in repeated contact of the said segments with other segments or teeth of resiliently faced or solid-toothed meshing gearing.

It will be observed that the taper and thickness of the outer edges of the laminated segments 6 and 6S of all of the resiliently faced gears of the present invention increase, decrease, and remain constant as the distance from the central shaft of said gears increases, decreases, or remains constant. This is illustrated most effectively in FIGURE 1, wherein the edges of the said segments are seen to increase or decrease in taper and thickness at their extreme outer edges, in the respective resilient frustro-conical face areas, while the taper ceases and the thickness remains constant at the resilient cylindrically formed plateau 3p areas.

The curving outer edge of the inclined faces 6c of the segments will demonstrate a variation of thickness approaching constancy for the same reason as hereinbefore stated, gradually thickening as the edge curves outwardly and gradually thinning as the said edge curves inwardly. A similar effect is seen at the juncture of the edges of said segments where the cylindrically formed plateau face area blends with the frustro-conical face area.

Since the same conditions are provided for in the mitre-spur-mitre gear 7, there is assured compatibility in mesh with the changing surface conditions of the resilient faces of the intermediate gear 3. The angle and taper of pitch of the teeth of the mitre face 7e correspond to the angle and pitch of the laminated segments of the frustro-conical face areas 3d and 3e; and the constancy of pitch of the teeth of the spur face 7d corresponds with the constancy of thickness of the axial extension 6p of the said segments at the cylindrically formed plateau face area 6p as well as with the constancy of pitch of the teeth 3t of the ring gears 3a, 3b and 3c. The blending of the said conditions at the junction of the two distinct tooth surfaces 7d and 7e corresponds to the blending of conditions at the junction of the plateau 3p areas and the said frustro-conical face 3d and 3e areas.

The above described conditions of corresponding increase in taper and thickness with the increase in radial distance, which is most desirable in any arrangement of the laminated segments for proper spaced relationship with each other in assembly, is another feature of design which provides for simplicity in the method for producing the laminated segments as well as the adjoining and similarly arranged component parts of the resiliently faced gears.

The laminated segments 6L and 6S, including the axial extension 6p thereof with its constancy of thickness throughout its length, and the segment separators 28, which are alternately spaced to form slots 24 and channels 25, as well as the spacers between the separators 28, may all be stamped or die-cut, side by side, from suitably widthwise tapered strip material. Positioning of the stamping media on the tapered strip at the same angle and at the same radial distance from the convergence point of the tapering sides of the tapered strip as the component parts are expected to normally be relative to the axis of the completed assembly will produce a stamping with the proper taper and thickness of its peripheral edges; and with the spaced relationship desired.

The degree of the widthwise taper of the tapered strip will determine or be determined by the total number of laminated segments 6 that can be circumferentially arranged in side-face spaced abutment with each other to make up the continuously adjacent laminated face of the respective intermediate gears. The number required of the said segments can then be determined by the number of wedge segments of the said tapered strip that can be circumferentially arranged around a central core to form a cylinder of continuously adjacent such laminated segments.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. In a resiliently faced gear of the general type described, a plurality of independently slidable, relatively adjacent blade-like laminations in uniform alignment; said laminations being susceptible to successive displacement and self-realignment; and means adapted to cause partial displacement of each lamination adjacent to any lamination individually displaced.

2. The combination of claim 1, wherein said means produces partial displacement of one adjacent lamination of greater degree than that caused of the other or oppositely adjacent lamination.

3. The combination of claim 1, wherein said means delays realignment of each lamination individually displaced sufficiently to cause a step-like formation of laminations which is of greater degree at the area of realignment than that of the similar step-like formation of said laminations caused at the area of displacement, when the aforementioned successive displacement is caused by a meshing gear in rotation in prescribed direction.

4. The combination of claim 1, wherein said means is adapated to prolong displacement of each lamination sufficiently to cause a distortion of the normally constant curve of the step-like formation of said laminations; said step-like formation of said laminations at the area of realignment being of greater radially angular degree than the similar step-like formation of said laminations caused at the area of displacement, when the aforementioned successive displacement is caused by a meshing gear in rotation in prescribed direction.

5. In a resiliently faced gear of the general type described, a plurality of independently slidable, relatively adjacent blade-like laminations in uniform alignment; said laminations being susceptible to successive displacement and self-realignment; and means adapted to delay realignment of each said lamination individually displaced sufficiently to cause a step-like formation of said laminations which is of a greater degree at the area of realignment than that of the similar step-like formation of said laminations caused at the area of displacement, when the aforementioned successive displacement is caused by a meshing gear in rotation in prescribed direction.

6. A variable ratio gear comprising a rotatable body portion; a plurality of substantally parallel and adjacent blade-like laminations mounted on said body portion; said blade-like laminations being independently slidable radially with respect to said body portion; means for holding said blade-like laminations against circumferential movement relative to said body portion; resilient means for urging said blade-like laminations outwardly with respect to the axis of said rotatable body portion; said blade-like laminations being susceptible to successive inward displacement; and a rigid-toothed gear carried by said body portion and adjoining said blade-like laminations.

7. A variable ratio gearing comprising a rotatable body portion; a plurality of substantially parallel and adjacent blade-like laminations mounted on said body portion; said blade-like laminations being independently slidable radially with respect to said body portion; means for holding said blade-like laminations against circumferential movement relative to said body portion; resilient means for urging said blade-like laminations outwardly with respect to the axis of said rotatable body portion; a rigid-toothed gear carried by said body portion and adjoining said blade-like laminations, and a rotatable gear for meshing with, and progressively displacing inwardly, portions of the periphery of said blade-like laminations; said last-named gear being also adapted to mesh with the said rigid-toothed gear.

8. A variable ratio gearing comprising a rotatable body portion; a plurality of substantially parallel and adjacent blade-like laminations mounted on said body portions; said blade-like laminations being independently slidable radially with respect to said body portion, means for holding said blade-like laminations against circumferential movement relative to said body portion; resilient means for urging said blade-like laminations outwardly with respect to the axis of said rotatable body portion; a rigid-toothed gear carried by said body portion and adjoining said blade-like laminations; and a rotatable gear; said rotatable gear being provided with a toothed area for meshing with, and progressively displacing inwardly, portions of the periphery of said blade-like laminations; and a separate toothed area for meshing with said rigid-toothed gear.

9. A variable ratio gearing comprising a rotatable body portion; a plurality of substantially parallel and adjacent blade-like laminations mounted on said body portion; said blade-like laminations being independently slidable radially with respect to said body portion; means for holding said blade-like laminations against circumferential movement relative to said body portion; resilient means for urging said blade-like laminations outwardly with respect to the axis of said rotatable body portion; a rigid-toothed gear carried by said body portion and adjoining said blade-like laminations, and a rotatable gear; the peripheral portions of said blade-like laminations and said rigid-toothed gear being angularly disposed with respect to each other; and a rotatable gear provided with two angularly disposed teeth areas, one of said teeth areas being adapted to mesh with, and angularly displace inwardly, portions of the periphery of said blade-like laminations and the other of said teeth areas being adapted to mesh with said rigid-toothed gear.

10. A variable ratio gear comprising a rotatable body portion; a plurality of independently slidable, relatively adjacent bladelike laminations mounted in uniform alignment on said body portion; said laminations being susceptible to successive displacement and self-realignment; and a rigid-toothed gear carried by said body portion.

11. The combination of claim 10, together with a rotatable gear for meshing with, and progressively displacing, portions of said blade-like laminations; said rotatable gear being also adapted to mesh with the rigid-toothed gear carried by said rotatable body portion.

References Cited

UNITED STATES PATENTS 2,066,758   1/1937   Bassoff _____ 74—461

FOREIGN PATENTS 820,087   11/1937   France.
289,659   10/1931   Italy.

DONLEY J. STOCKING, *Primary Examiner.*

DAVID J. WILLIAMOWSKY, *Examiner.*

H. S. LAYTON, *Assistant Examiner.*